United States Patent
Hofmann et al.

(10) Patent No.: US 9,107,163 B2
(45) Date of Patent: Aug. 11, 2015

(54) METHOD FOR CONTROLLING OPERATION ACTIVITY MODES OF A WIRELESS TELECOMMUNICATIONS TERMINAL

(75) Inventors: Matthias Hofmann, Freital (DE); Thomas Konrad, Dresden (DE)

(73) Assignee: Intel Mobile Communications GmbH, Neubiberg (DE)

( * ) Notice: Subject to any disclaimer, the term of this patent is extended or adjusted under 35 U.S.C. 154(b) by 31 days.

(21) Appl. No.: 13/158,690

(22) Filed: Jun. 13, 2011

(65) Prior Publication Data

US 2011/0305215 A1    Dec. 15, 2011

(30) Foreign Application Priority Data

Jun. 11, 2010  (EP) .................................... 10165633

(51) Int. Cl.
*H04W 4/00*       (2009.01)
*H04W 52/02*      (2009.01)
*H04W 76/04*      (2009.01)

(52) U.S. Cl.
CPC ...... *H04W 52/0222* (2013.01); *H04W 52/0216* (2013.01); *H04W 76/048* (2013.01); *Y02B 60/50* (2013.01)

(58) Field of Classification Search
USPC ................................................ 370/328–352
See application file for complete search history.

(56) References Cited

U.S. PATENT DOCUMENTS

| 7,978,616 B2 * | 7/2011 | Chun et al. ..................... 370/242 |
| 8,094,618 B2 * | 1/2012 | Yi et al. ......................... 370/329 |
| 8,155,625 B2 * | 4/2012 | Morgan ..................... 455/412.1 |
| 8,169,956 B2 * | 5/2012 | Malladi ......................... 370/329 |
| 8,239,721 B2 * | 8/2012 | Pelletier et al. ............... 714/749 |
| 8,305,965 B2 * | 11/2012 | Shen et al. .................... 370/328 |
| 8,422,480 B2 * | 4/2013 | Ho ................................ 370/346 |

(Continued)

FOREIGN PATENT DOCUMENTS

EP    2190253 A1    5/2010

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 9)", No. V9.2.0, Apr. 21, 2010, pp. 1-45.

(Continued)

*Primary Examiner* — Nicholas Sloms
(74) *Attorney, Agent, or Firm* — Schwegman Lundberg & Woessner, P.A.

(57) ABSTRACT

A method is provided for controlling Discontinuous Reception (DRX) mode in telecommunication user equipment (UE), with the object to improve system power consumption of a UE of a wireless communication system that is running the DRX mode in RRC_CONNECTED state. In an LTE communication system, DRX functionality is applied to the Medium Access Control (MAC) layer to discontinue monitoring the Physical Downlink Control Channel (PDCCH) for certain periods in order to reduce power consumption of the UE. Typical physical UE implementations have the stack controller and the Physical Layer (PHY) running on several hardware blocks that can enter power saving modes independently. The method comprises a partitioning of the functionality between stack controller and PHY layer that allows the stack controller entity to be active at a minimum while ensuring that the UE still behaves standard compliant to the network.

10 Claims, 8 Drawing Sheets

(56) References Cited

U.S. PATENT DOCUMENTS

| | | | |
|---|---|---|---|
| 8,451,795 B2* | 5/2013 | Ho et al. | 370/331 |
| 8,665,804 B2* | 3/2014 | Meylan et al. | 370/329 |
| 2008/0026744 A1* | 1/2008 | Frederiksen et al. | 455/425 |
| 2008/0205348 A1* | 8/2008 | Malladi | 370/335 |
| 2008/0232310 A1* | 9/2008 | Xu | 370/329 |
| 2009/0040982 A1* | 2/2009 | Ho et al. | 370/331 |
| 2009/0086704 A1* | 4/2009 | Ho | 370/346 |
| 2009/0141690 A1* | 6/2009 | Fan et al. | 370/335 |
| 2009/0207794 A1 | 8/2009 | Meylan | |
| 2009/0257385 A1* | 10/2009 | Meylan et al. | 370/329 |
| 2011/0002262 A1* | 1/2011 | Wang et al. | 370/328 |
| 2011/0026498 A1* | 2/2011 | Zheng et al. | 370/336 |
| 2011/0051643 A1* | 3/2011 | Hans et al. | 370/311 |
| 2011/0083066 A1* | 4/2011 | Chung et al. | 714/807 |
| 2011/0151944 A1* | 6/2011 | Morgan | 455/574 |
| 2011/0305215 A1* | 12/2011 | Hofmann et al. | 370/329 |
| 2012/0184282 A1* | 7/2012 | Malkamaki et al. | 455/450 |
| 2012/0201217 A1* | 8/2012 | Malladi | 370/329 |
| 2012/0275362 A1* | 11/2012 | Park et al. | 370/311 |
| 2012/0327802 A1* | 12/2012 | Jung et al. | 370/252 |
| 2013/0163532 A1* | 6/2013 | Anderson et al. | 370/329 |
| 2013/0163533 A1* | 6/2013 | Anderson et al. | 370/329 |
| 2013/0163534 A1* | 6/2013 | Anderson et al. | 370/329 |
| 2013/0163535 A1* | 6/2013 | Anderson et al. | 370/329 |
| 2013/0163536 A1* | 6/2013 | Anderson et al. | 370/329 |
| 2013/0163537 A1* | 6/2013 | Anderson et al. | 370/329 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC) protocol specification (Release 9)", No. V9.2.0, Apr. 21, 2010, pp. 1-236.

European Search Report for EP 11169382.6 dated Sep. 11, 2012.

* cited by examiner

METHOD FOR CONTROLLING OPERATION ACTIVITY MODES OF A WIRELESS TELECOMMUNICATIONS TERMINAL

CROSS REFERENCE TO RELATED APPLICATION

This application claims priority of European patent application No. 10165633.8 filed on Jun. 11, 2010, the entire contents of which is hereby incorporated by reference.

FIELD OF THE INVENTION

The invention relates to a method for controlling operation activity modes of a telecommunications terminal affiliated to a wireless telecommunications network

BACKGROUND OF THE INVENTION

3GPP LTE (3rd Generation Partnership Project Long Term Evolution) is the upcoming standard of 4th generation radio access networks. A continuing major challenge for designers is to reduce the system power consumption of mobile terminals, also known as User Equipment (UE) in LTE terminology. In recent communication schemes like UMTS and the upcoming LTE system, UEs use a Discontinuous Reception (DRX) mode.

Figure 1:
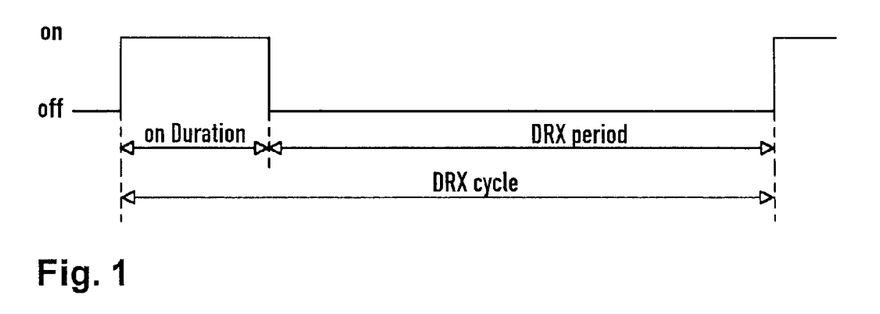
FIG. 1 illustrates the basic principle of DRX functionality.

DRX means that the UE discontinues monitoring the Physical Downlink Control Channel (PDCCH) for well-defined sub frames (e.g. 2 ms per 20 ms) and is allowed to enter a power saving mode. FIG. 1 shows the basic principle of DRX functionality. The DRX procedure is defined by a set of UE specific parameters that are configured via Radio Resource Control (RRC) signaling. The RRC protocol has two states: RRC_IDLE and RRC_CONNECTED. The RRC_CONNECTED state means that the respective UE is known to the network, the UE's location is known on cell level, mobility is controlled by the network, unicast data transfer is possible, and that the DRX mode is supported for power saving.

The DRX procedure basically consists of DRX cycles that have an 'on' duration where the UE shall monitor the PDCCH for dynamic schedules, and a DRX period where the UE is allowed to discontinue monitoring the PDCCH and may go to a power save mode.

Figure 2:
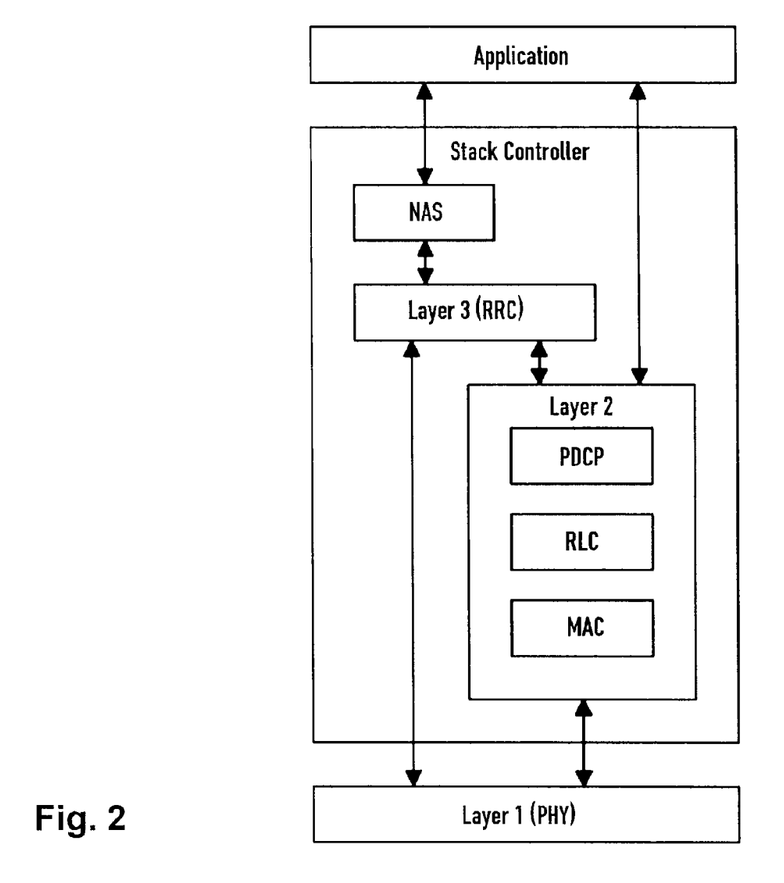
FIG. 2 shows the protocol architecture of an LTE user equipment.

FIG. 2 illustrates a protocol stack of a UE according to LTE standard specifications in the terms of the OSI (Open Systems Interconnection) model of logical layers. As is known in the art, the Non-Access Stratum (NAS) layer protocol is responsible for signalling and traffic between UE and the network for control purposes such as network attach, authentication, setting up of bearers, and mobility management. The Radio Resource Control (RRC) protocol of layer 3 is responsible for control plane signalling between a UE and the network, i.e. such tasks as broadcast of system information; establishment, maintenance and release of RRC connection; establishment, configuration, maintenance and release of signalling and data radio bearers; security functions including key management; mobility functions such as control of UE cell selection/reselection; paging; UE measurement configuration, processing and reporting; handover; quality of service (QoS) management functions; UE measurement reporting and control of the reporting, but not exclusively. Layer 3 interfaces with layer 2 and also directly interfaces with layer 1. Layer 2 of the protocol stack comprises a Packet Data Control Protocol (PDCP) sub-layer which is responsible for (de-) compressing the headers of user plane IP packets, a Radio Link Control (RLC) sub-layer which is used to format and transport traffic, and a Medium Access Control (MAC) sub-layer which provides addressing and channel access control mechanisms. Layer 3 interfaces with layer 2 and layer 1. Layer 1, also known as physical (PHY) layer, translates logical communication requests into hardware-specific operations such as modulation, bit synchronization, multiplexing, equalization, forward error correction etc. It has to be noted in this context that typical physical UE implementations have the stack controller and the physical (PHY) layer running on separate hardware blocks that can enter power saving modes independently. In other words, the aforementioned logical layers of a single UE are typically implemented in hardware as separate systems-on-a-chip (SoCs) which might even be provided by different vendors.

According to LTE protocol standard specifications, the DRX functionality is controlled by the MAC layer, i.e. the MAC layer is responsible for controlling DRX cycles. It has to wake up prior to an 'on' duration in order to wake up layer 1.

However, when implemented in the MAC layer as per definition of the standard, some inefficiency with respect to power consumption is system immanent:

- The MAC layer does not have the exact knowledge of the timing of the physical layer (PHY), and therefore it has to schedule wake-up prior to an 'on' duration well in advance to ensure full operation timely.
- Due to the latencies between MAC and PHY layers, the PHY layer and especially the transceiver thereof, is turned off with significant latency compared to the opportunity as seen on the air interface.
- The MAC layer, and hence the entire hardware block that implements layer 2 or the entire stack controller, is active for 'on' durations that expire without any activity.

A general object of the invention is to improve the system power consumption of user equipment (UE) of a wireless communication system that is running the DRX mode in RRC_CONNECTED state.

SUMMARY OF THE INVENTION

The invention provides a method for controlling operation activity modes of a telecommunications terminal affiliated to a wireless telecommunications network. The terminal receives configuration data from the network upon connection to the network at a Radio Resource Control layer of a protocol stack of the terminal. The method is characterized in that configuration data are communicated from the RRC layer to a physical layer of the terminal, and that the physical layer controls a stack controller of the terminal to go into and off a power save mode in function of these configuration data and in function of any activity events detected.

The configuration data may comprise Discontinuous Reception (DRX) configuration data that configure a DRX 'on' duration during which the terminal monitors a Physical Downlink Control Channel. In another embodiment, the configuration data comprise Semi-Persistent Scheduling (SPS) configuration data.

In a preferred embodiment, the step of controlling the stack controller comprises, in case the physical layer does not detect any activity during DRX 'on' durations, keeping the stack controller in a power save mode. Also, the step of controlling the MAC layer comprises deciding when to enter the next DRX period, by the physical layer.

So the present invention solves the aforementioned problems with a re-distribution of tasks between stack controller and PHY layer in a sense that the PHY layer takes over the control of the DRX procedure. The terminal can then (1) schedule the wake-up time at an optimum; (2) turn off PHY components, especially the transceiver, with minimum latency; and (3) keep the stack controller in power save mode for 'on' durations without activity.

The awake time of the PHY layer can also be optimized, because the PHY layer has a far better knowledge about timing on the air interface than the stack controller has so that the times to wake up and to go sleeping can be scheduled much more accurately.

In one embodiment, in case of unsuccessful data transmission received at layer 1 the step of controlling the stack controller comprises proceeding with downlink retransmission according to a Hybrid Adaptive Response and Request (HARQ) protocol, by layer 1, and keeping the stack controller in a power save mode until data transmission is successful. Additionally, the method may comprise the further step of layer 1 entering a DRX period of inactivity during a retransmission round-trip time of the HARQ protocol.

In contrast to the distribution of tasks as proposed by the standard and implemented in well-known protocol stack controller hardware solutions for DRX and SPS functionalities, the method according to the invention implements a re-distribution of tasks between stack controller and PHY layer of a wireless terminal, thus minimizing the awake time for both entities when DRX functionality is configured.

The solution of the present invention provides a way to optimize the power consumption of a terminal that has DRX configured compared to solutions that follow the standard distribution of tasks between MAC and PHY layers.

BRIEF DESCRIPTION OF THE DRAWINGS

Additional features and advantages of the present invention will be apparent from the following detailed description of specific operational embodiments which are given by way of example only and in which reference will be made to the accompanying drawings, wherein.

DETAILED DESCRIPTION OF PREFERRED EMBODIMENTS

The protocol stack of FIG. 2 illustrates the context of the inventive idea, i.e. to allocate DRX control functionality to layer 1 (PHY) instead of being part of the MAC layer.

Figure 3:
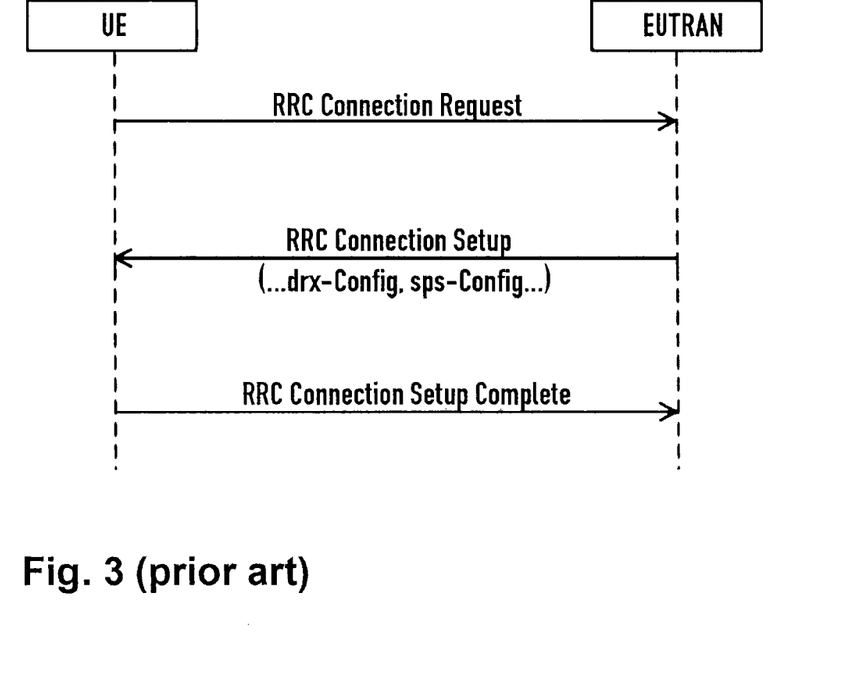
FIG. 3 shows the RRC connection setup procedure according to prior art.
Figure 4:
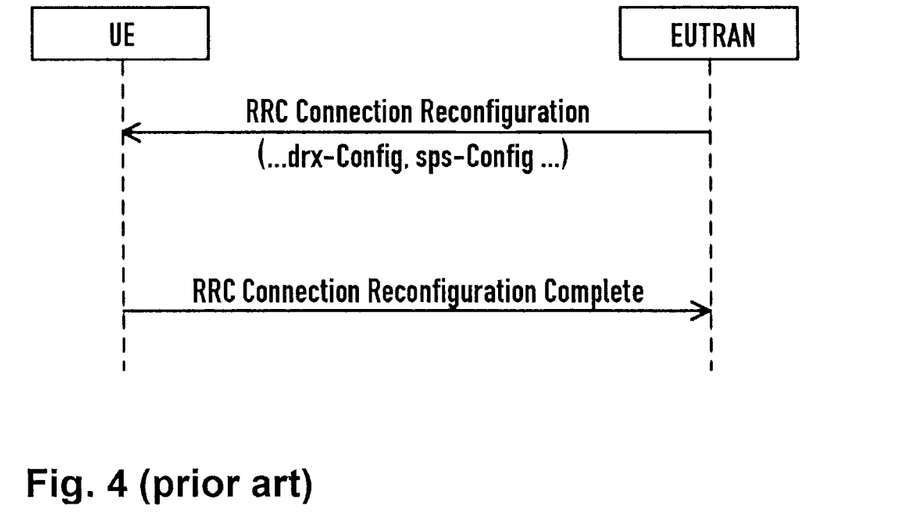
FIG. 4 shows the RRC connection reconfiguration procedure according to prior art.

FIG. 3 and FIG. 4 illustrate RRC connection setup and connection reconfiguration procedures, respectively, between a wireless terminal and a telecommunications network as specified by the LTE standard. In response to an RRC Connection Request from a UE to the network (EUTRAN, Evolved UMTS Terrestrial Radio Access Network, in LTE terminology), the network sends a RRC Connection Setup message to the UE that includes, among others, DRX configuration parameters. In another embodiment, the RRC Connection Setup message may also include configuration parameters for Semi-Persistent Scheduling (SPS).

Semi-Persistent Scheduling is supported by LTE to reduce signalling overhead for traffic with periodic transmissions. To this end, uplink and downlink resources are configured to occur at a specific interval. To give one example: for voice over IP telephony a base station might configure a UE to send packets exactly every 20 ms which is signaled to the UE at the beginning of the call. Only a first assignment/grant needs to be signalled; subsequent transmissions use the same resources as the first transmission.

In case of an RRC connection reconfiguration, e.g. upon cell to cell handover, DRX functionality and SPS functionality, if applicable, are reconfigured as well by the network on the RRC layer, as shown in FIG. 4.

Figure 5:
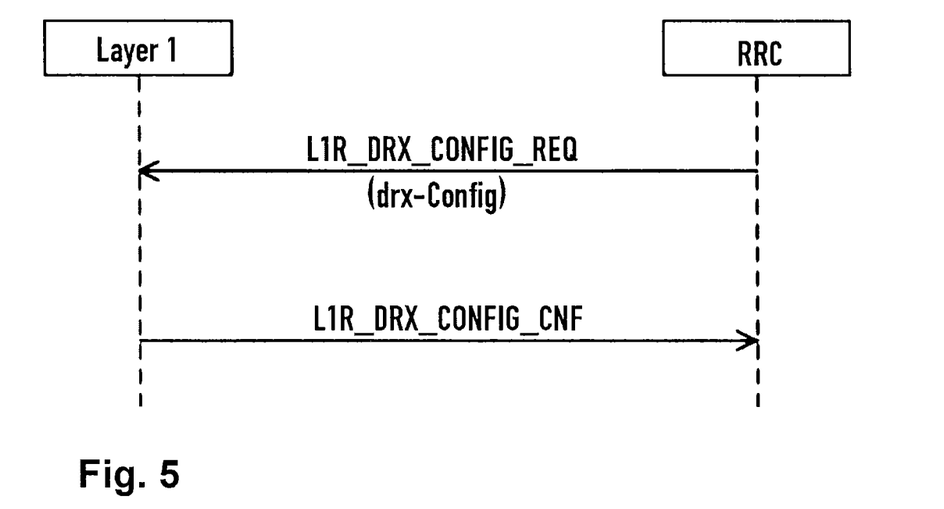
FIG. 5 illustrates the DRX configuration procedure according to the invention.

FIG. 5 illustrates the DRX configuration procedure according to the invention within a UE. The RRC layer of an UE that has implemented DRX functionality according to the invention will pass the drx-Config information element (IE) that has been received from the network in an RRC Connection Setup message or RRC Connection Reconfiguration message to the layer 1 of the UE, using an L1R_DRX_CONFIG_REQ message, as shown in FIG. 5.

Figure 6:
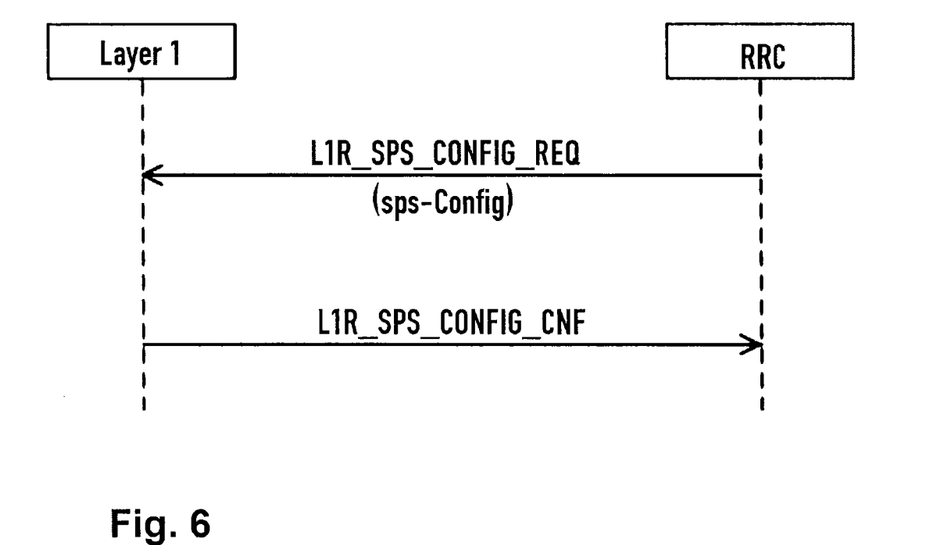
FIG. 6 illustrates the SPS configuration procedure according to the invention.

FIG. 6 illustrates an SPS configuration procedure according to an embodiment of the invention. For optimized operation it is also necessary that layer 1 is informed about the configuration of semi-persistent scheduling (SPS) which is, according to LTE standard specifications, a MAC functionality as well. The base station will synchronize DRX and SPS functionality so that SPS activity always falls into a DRX 'on' duration. So if SPS configuration parameters are included in the RRC message from the network, an sps-Config IE is transferred from RRC layer to layer 1 using a separate message, designated L1R_SPS_CONFIG_REQ in FIG. 6.

Layer 1 will proceed with these DRX and SPS configurations as specified by the respective standards for these functionalities in the MAC layer. DRX and SPS configurations may occur independently from another, and the order thereof is not an issue.

Figure 7:
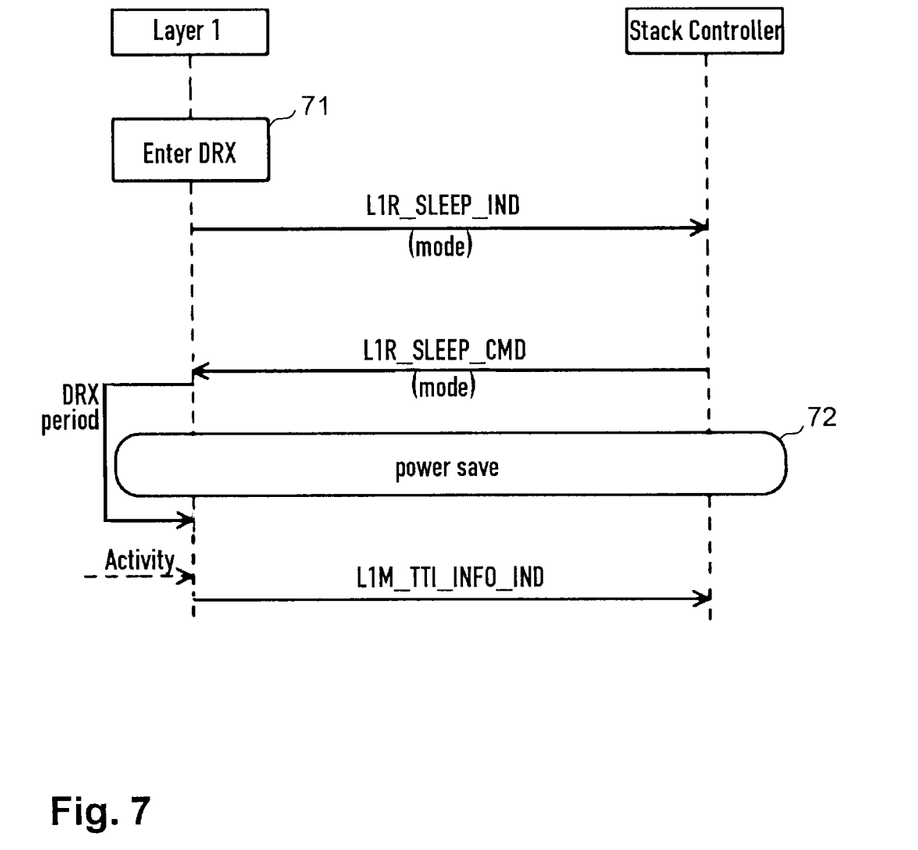
FIG. 7 illustrates a procedure between stack controller and PHY layer to enter power save mode according to the invention.

FIG. 7 illustrates the procedure between stack controller and PHY layer to enter a power save mode according to the invention. After entering the DRX period, at 71, layer 1 informs the stack controller that the UE can now go to a power save mode using L1R_SLEEP_IND which comprises a message that proposes the power-save mode, as shown in FIG. 7. The power-save mode describes which resources are turned off during the sleep phase in terms of e.g. clocks and power domains of layer 1. Upon reception of this message, the stack controller, e.g. the MAC layer thereof, finally decides about the power save mode and commands layer 1 to go to power save using a L1R_SLEEP_CMD command message. Both sub-systems then enter this mode, at 72. Layer 1 will take care of the wake-up timing henceforward. That is, layer 1 sets a DRX period timer and wakes up when the timer expires. After having sent the sleep command message to layer 1 (L1R_SLEEP_CMD), the stack controller has to assume that the message interface to layer 1 is not usable unless it gets a message from layer 1 which is referred to as L1M_TTI_INFO_IND in the figures. This trigger time interval information indication message is typically sent with each data sub-frame, and it is used with the invention as an indication for the stack controller that the physical layer is awake, and to signal the stack controller to wake up.

Figure 8:
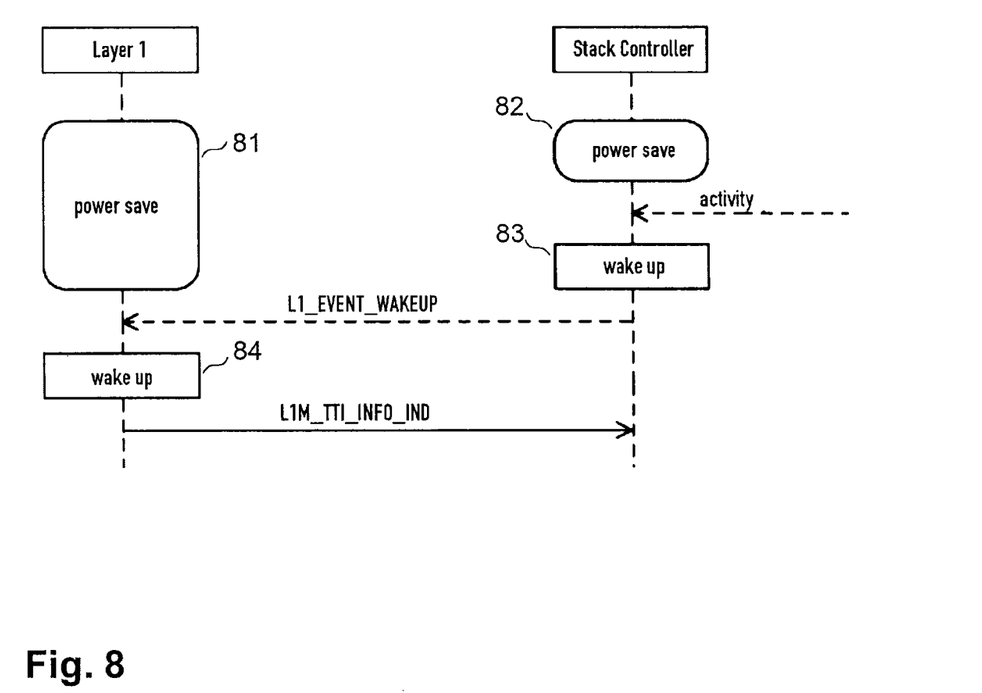
FIG. 8 illustrates a procedure to wake up PHY from stack controller according to the invention.

FIG. 8 illustrates the procedure to wake up layer 1 from the stack controller according to the invention. In case layer 1 and the stack controller are in a power save mode, at 81 and 82, respectively, and an internal activity or an upper layer request, i.e. from the application, is detected at the stack controller, typically at the MAC layer, the stack controller needs to wake up layer 1 triggered by this event. So the stack controller wakes up, at 83, and initiates wake-up of layer 1 by a special interrupt, L1_EVENT_WAKEUP, as shown in FIG. 8. Layer 1 wakes up at 84 and signals the stack controller that it is awake, using L1M_TTI_INFO_IND message.

Figure 9:
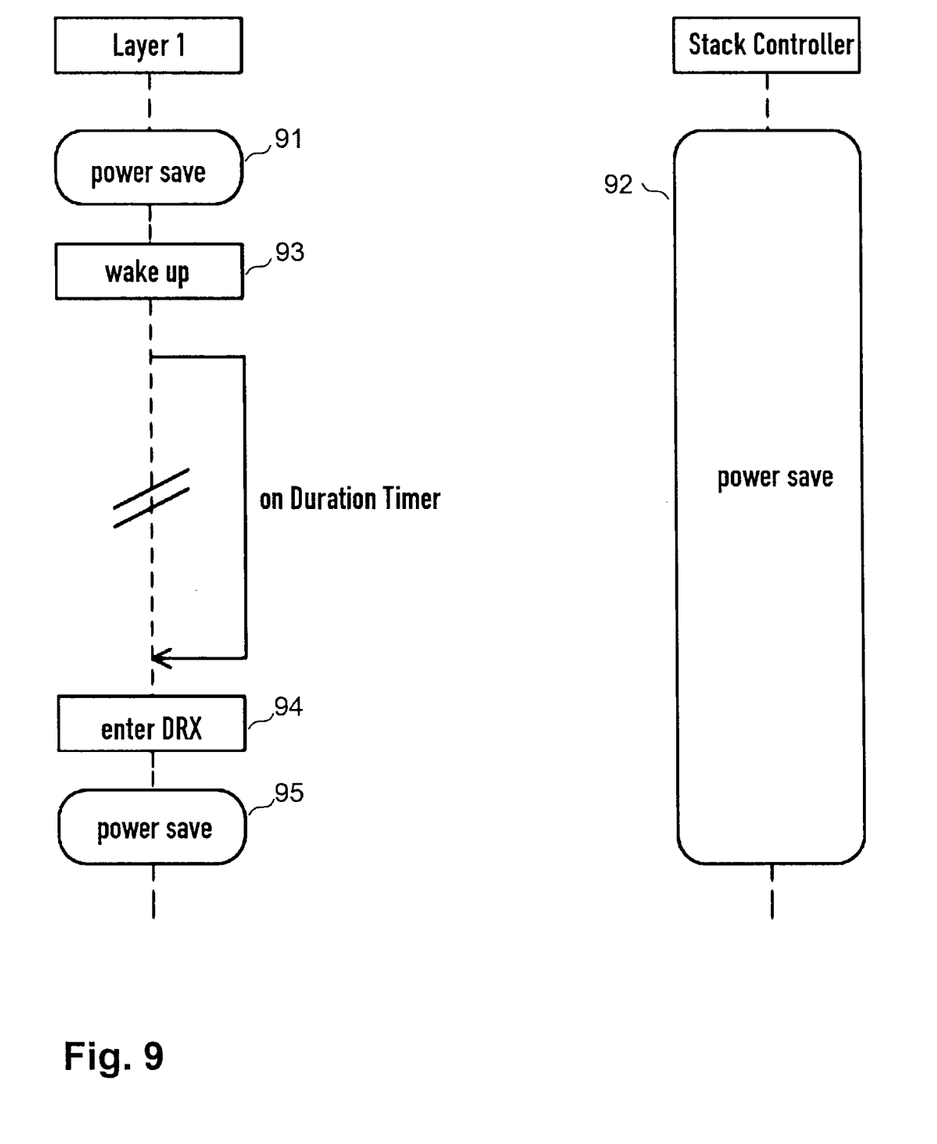
FIG. 9 illustrates a DRX procedure to handle an empty 'on' duration according to the invention.
Figure 11:
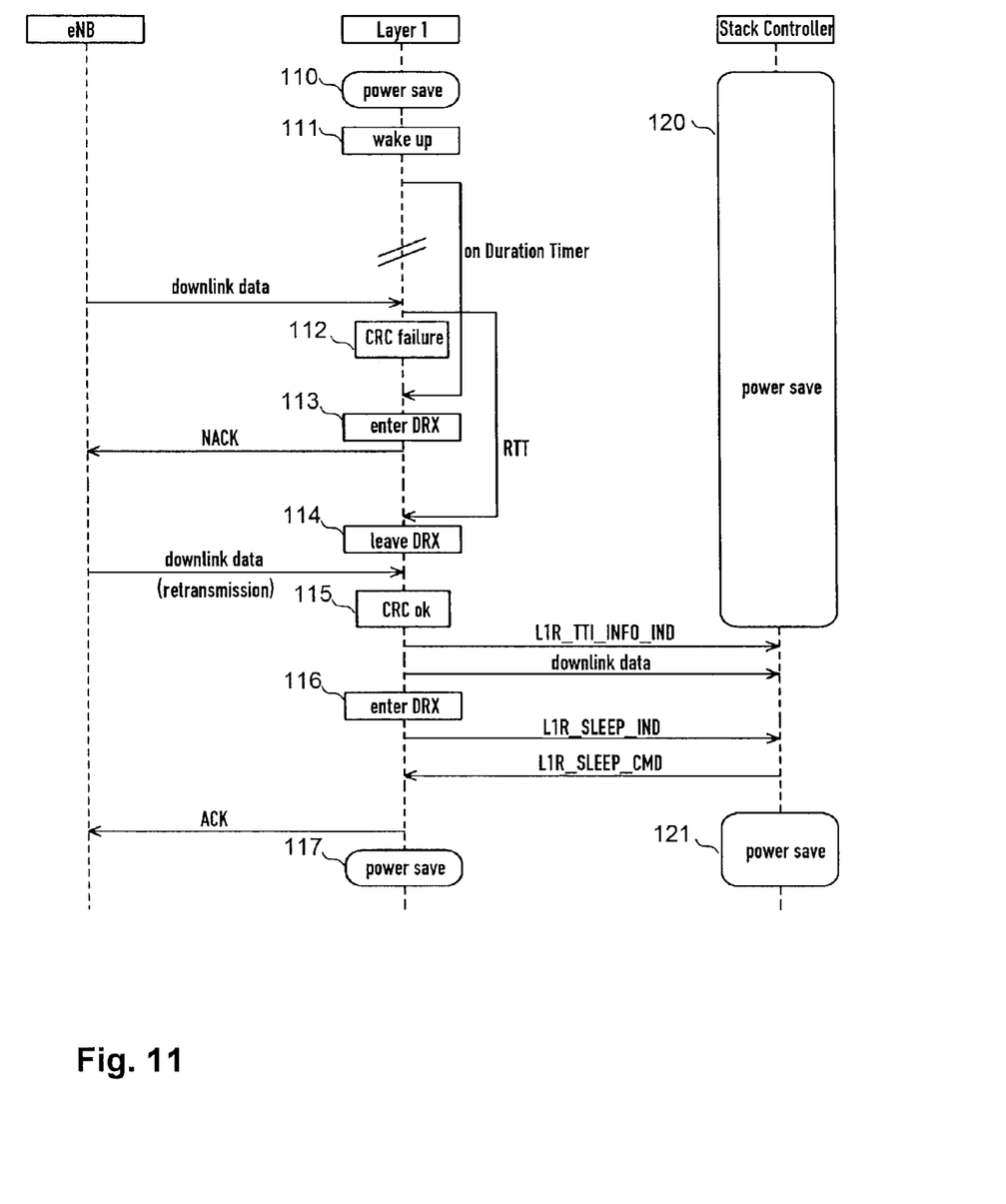
FIG. 11 illustrates a procedure to handle downlink transmissions including HARQ retransmission.

The reduction of power consumption by minimizing the awake time for both stack controller and PHY layer will be understood more thoroughly from two exemplary operational procedures, namely for an empty 'on' duration as illustrated in FIG. 9, and for a downlink data transmission, e.g. an SPS transmission, as illustrated in FIG. 11 and described below. With standard task distribution the awake time of the stack controller is significantly longer for these use cases than with the solution proposed by the invention.

FIG. 9 illustrates the DRX procedure to handle an empty 'on' duration according to the invention. At 91 and 92, layer 1 and stack controller, respectively, are in a power save mode. After expiration of a DRX period timer as shown in FIG. 7, layer 1 will wake up, at 93, for the next 'on' duration. In case no activity is detected in the period until an 'on' duration timer expires, layer 1 will re-enter DRX period, at 94, and will go into a power save mode, at 95, without waking up the stack controller in between.

Figure 10:
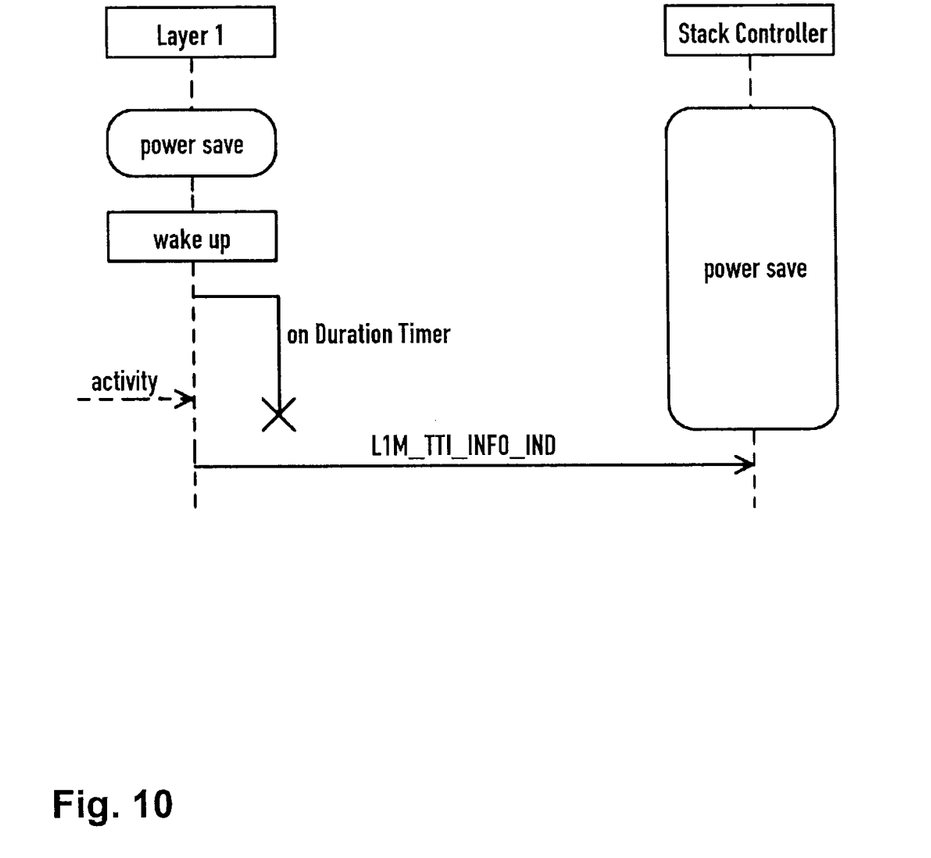
FIG. 10 illustrates a procedure to wake up the system by dynamic scheduling during 'on' duration.

If, however, there is an external activity detected at layer 1 during 'on' duration, as shown in FIG. 10, which activity may either consist of dynamic grants from the PDCCH or semi-static grants as configured by SPS configuration described with reference to FIG. 6, layer 1 will wake up the stack controller using a L1M_TTI_INFO_IND message.

FIG. 11 illustrates an operation procedure to handle downlink data transmissions, i.e. semi-persistent downlink grants, including retransmission. At 110 and 120, layer 1 and stack controller, respectively, are in a power save mode. After expiration of a DRX period timer as shown in FIG. 7, layer 1 will wake up, at 111, for the next 'on' duration. In case of downlink only activity, i.e. traffic from the servicing base station to the UE, layer 1 will only wake up the stack controller upon successful reception. In the operation example of FIG. 11, downlink data are received by layer 1 during the 'on' duration from a servicing base station, designated eNB (extended Node B) in the figure, according to LTE terminology.

If the reception is unsuccessful, layer 1 proceeds with the downlink retransmission according to a HARQ (Hybrid Adaptive Response and Request) protocol without interaction with the stack controller until reception was successful. As is known to those skilled in the art, LTE supports the HARQ protocol for a highly reliable transport. According to HARQ specifications, layer 1 applies a CRC protection to transport blocks, discards erroneous transport blocks, and initiates retransmission of erroneous transport blocks by a negative acknowledge (NACK) message.

In the operation example of FIG. 11, layer 1 detects erroneous transmission at 112, returns a NACK message which entails retransmission of the erroneous data packets, and detects successful retransmission at 115. At the same time, the UE is allowed to go to power save again directly after the 'on' duration has expired. In this way the awake time for layer 1 as well as for layer 2, or the entire stack controller, respectively, is highly optimized. Besides letting the stack controller in power save mode, at 120, until downlink data are successfully received, layer 1 takes the opportunity, as allowed by the standard, to enter DRX, at 113, during the retransmission round-trip time (RTT). Immediately following delivery of the downlink data, layer 1 initiates the power-down procedure, at 116, with the stack controller, and both entities go into power save, at 121 and 117, respectively.

After any uplink or downlink activity, layer 1 decides when to enter the next DRX period based on the rules defined in the respective protocol standard, and communicates this with the stack controller, as shown in FIG. 7.

Reconfiguration and release of DRX as well as the SPS procedure is signaled on RRC layer with the RRC connection reconfiguration as shown in FIG. 3, and is passed to Layer 1 as shown in FIG. 5 and FIG. 6. Layer 1 then appropriately applies the modifications to the configuration.

It has thus been disclosed a method for improving system power consumption of user equipment by distributing the control of DRX functionality between stack controller and PHY layer in a manner that allows the stack controller entity to be active at a minimum while ensuring that the UE still behaves standard compliant to the network. While the method has been described with reference to LTE standard specifications and terminology, it is not limited thereto; rather DRX functionality is also supported in UMTS, so the method features can be applied in UMTS schemes accordingly.

Modifications and combinations of the disclosed method features will be apparent to those skilled in the art and come within the scope of the invention as defined by the appended claims.

The invention claimed is:

1. A method for controlling operation activity modes of a telecommunications terminal affiliated to a wireless telecommunications network, comprising receiving configuration data from the network upon connection to the network at a Radio Resource Control (RRC) layer of a protocol stack of the terminal; the method further comprising:
    communicating said configuration data from the RRC layer to a physical layer entity of the terminal; and
    the physical layer entity controlling a stack controller entity of the terminal to go into and off a power save mode as a function of said configuration data and as a function of any activity events detected,
    wherein said stack controller entity executes functionality of layers above the physical layer entity,
    wherein said configuration data comprise Semi-Persistent Scheduling (SPS) configuration data, and
    wherein the controlling the stack controller comprises, in case of unsuccessful data transmission received at the physical layer entity, the physical layer entity proceeding with downlink retransmission according to a Hybrid Adaptive Response and Request (HARQ) rotocol and keeping the stack controller in a power save mode until data transmission is successful.

2. The method of claim 1, wherein said configuration data comprise Discontinuous Reception (DRX) configuration data that configure an DRX 'on' duration during which the terminal monitors a Physical Downlink Control Channel (PDCCH).

3. The method according to claim 2, wherein the controlling the stack controller comprises, in case the physical layer entity does not detect any activity during DRX 'on' durations, keeping the stack controller in a power save mode.

4. The method according to claim 1, wherein the controlling the stack controller comprises deciding when to enter a next DRX period, by the physical layer entity.

5. The method of claim 1, further comprising the physical layer entity entering a DRX period of inactivity during a retransmission round-trip time of the HARQ protocol.

6. A telecommunications terminal configured to affiliate with a wireless telecommunications network, the telecommunications terminal comprising:
 a protocol stack including:
  a Radio Resource Control (RRC) layer configured to receive configuration data from the wireless telecommunications network upon connection to the wireless telecommunications network;
  a stack controller configured to execute functionality of layers above a physical layer entity; and
  the physical layer entity, the physical layer entity configured to control an entity of the stack controller to go into and off a power save mode as a function of the configuration data and as a function of any activity events detected;
 wherein the configuration data comprise Semi-Persistent Scheduling (SPS) configuration data, and
 wherein, in case of unsuccessful data transmission received at the physical layer entity, the physical layer entity is configured to proceed with downlink retransmission according to a Hybrid Adaptive Response and Request (HARQ) protocol and to keep the stack controller in a power save mode until data transmission is successful.

7. The telecommunications terminal of claim 6, wherein the configuration data includes Discontinuous Reception (DRX) configuration data configured to configure a DRX 'on' duration during which the terminal monitors a Physical Downlink Control Channel (PDCCH).

8. The telecommunications terminal of claim 7, wherein the physical layer entity is configured to keep the stack controller in a power save mode if activity is not detected during DRX 'on' durations.

9. The telecommunications terminal of claim 6, wherein the physical layer entity is configured to decide when to enter a next DRX period.

10. The telecommunications terminal of claim 6, wherein the physical layer entity is configured to enter a DRX period of inactivity during a retransmission round-trip time of the HARQ protocol.

\* \* \* \* \*